Patented Dec. 23, 1930

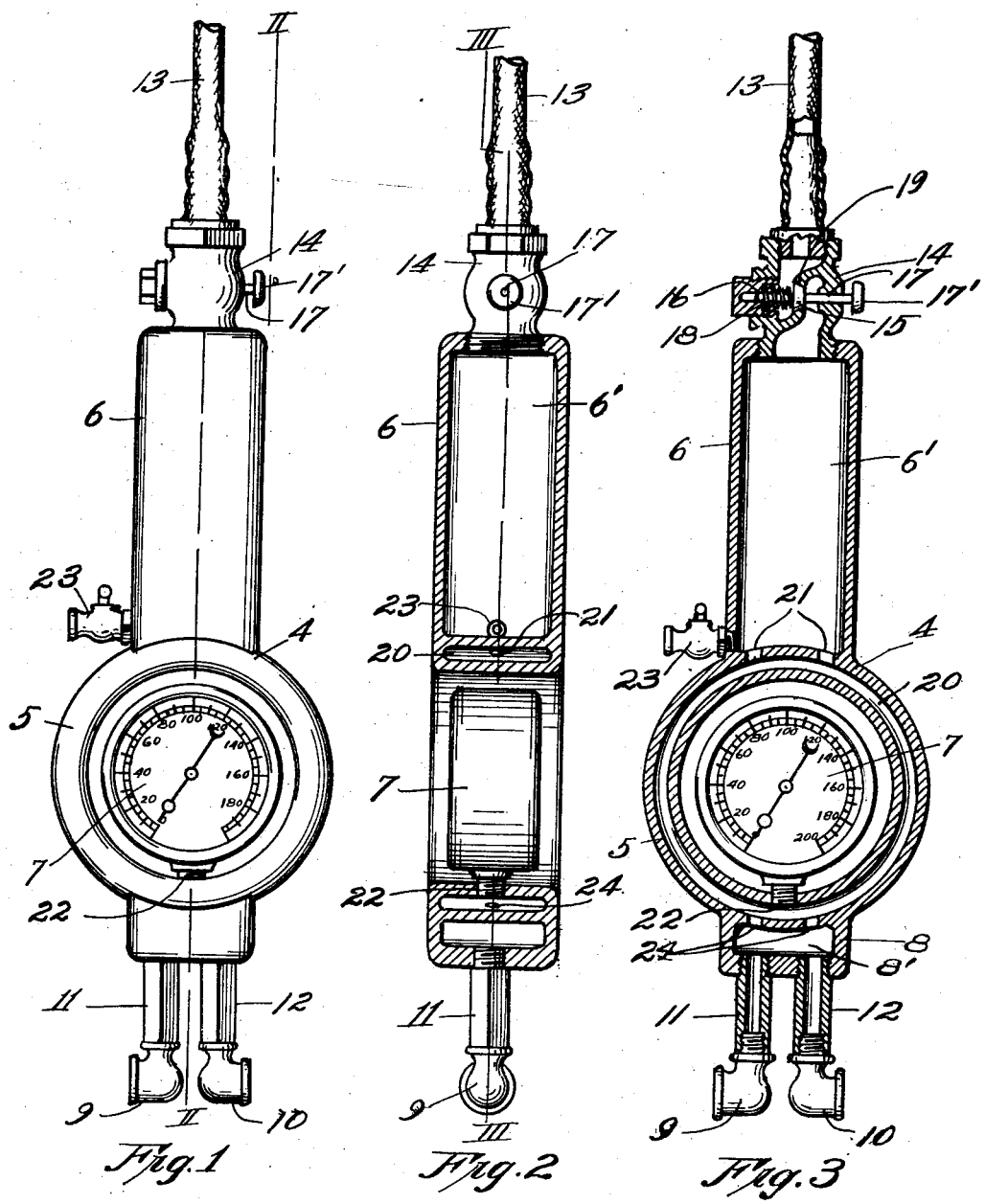

1,786,103

UNITED STATES PATENT OFFICE

ARCHIE M. BAIRD AND FRED J. PARTRIDGE, OF TOPEKA, KANSAS; MARY L. BAIRD, ADMINISTRATRIX OF SAID ARCHIE M. BAIRD, DECEASED, ASSIGNORS TO BAIRD PNEUMATIC REGISTER COMPANY, OF TOPEKA, KANSAS, A CORPORATION

AIR-SERVICE CONTROL AND REGISTER FOR PNEUMATIC TIRES

Application filed November 23, 1927. Serial No. 235,292.

This invention relates to air service control and register for pneumatic tires, and especially to that type which is mounted on the free end of the service hose for the purpose of regulating the flow of compressed air from a compressed air supply to the pneumatic tire, and also for the registering of the amount of pressure within said tire.

One of the objects of this invention is to provide an air service control and register having a manually controlled inlet valve which operates independently of the service chuck by means of which the air pressure from the service hose is normally cut off from said register and service chuck.

Another object is the contemplation of a device by means of which the operator may test the air pressure in the tire and also deflate said tire without interference from the high pressure air through the supply hose.

A further object is the provision of a control device and register having oppositely disposed service chucks.

Other objects are simplicity of construction, ease of operation and adjustability to many conditions and uses.

With these general objects in view, as well as minor objects which will appear in the course of the detailed specification, the invention will now be described with reference to the accompanying drawing illustrating a construction embodying the improvements of this invention.

In the drawings—

Figure 1, is a front elevation of an air service control and register for pneumatic tires embodying this invention.

Fig. 2, is a longitudinal section taken on line II—II of Fig. 1, with the control valve in elevation, and Fig. 3, is a longitudinal sectional view taken on line III—III of Fig. 1.

Similar reference characters designate like parts throughout the several views, and the numeral 4 designates a hollow body member which is preferably cast from some light material, such as aluminum, and consists of an open annular ring 5, and an elongated handle portion 6 extending therefrom. The opening in said annular ring 5 is of suitable size to receive and house the ordinary pressure gauge 7. Body member 4 is also provided with a hollow lug 8 which serves to carry the oppositely disposed service chucks 9 and 10, thru the intermediacy of the tubes 11 and 12, which communicate with the chamber 8', in said hollow lug, and with the service chucks 9 and 10 respectively. While the lug 8 has been shown diametrically opposite the handle 6, yet it is desired not to limit it to this position, since under certain conditions it is desirable to change the relative positions of these parts.

The service hose 13, which receives the supply of pressure fluid from any suitable source communicates with the hollow handle 6. A control valve 14 is positioned between said service hose and handle so that air passing from the service hose to the handle must pass thru said control valve. Slidably mounted in control valve 14 is a valve 15, with axially disposed stems 16 and 17. Stem 16 serves as a guide for the compression spring 18, which is so positioned as to normally hold the valve 15 to its seat 19, thus closing the valve. It will also be noted that the valve is so positioned that the high air pressure from the service hose 13 will also tend to close it. The stem 17 extends thru the valve casing, and is provided at its outer end with a button 17', by means of which the operator may compress the spring 18 and open the valve to permit the compressed air to pass thru the service hose to the hollow body member 4.

With this construction of control valve, the operator may easily regulate the flow of fluid pressure from the service hose to the hollow handle 6. The chamber 6' in the handle 6 serves as a receptacle for the fluid pressure from the service hose and being of considerable area will maintain substantially the same air pressure as that within the tire, which is being inflated, as hereinafter described. Chamber 6' communicates with the annular passage-way 20 in the ring 5 thru the openings 21 formed in the outer wall thereof. The annular passage-way 20 also communicates with the chamber 8' thru the openings 24 also formed in the outer wall of the ring 5. The pressure gauge 7 is of the ordinary type and has the usual threaded stem 22 which is fitted into the threaded hole in the inner wall of ring 5 adjacent the service chucks so that when the device is in its normal position, which is with the service chucks extending downwardly, then the pressure gauge will be properly drained. An important feature of this device is the positioning of the pressure gauge 7 within the ring 5 so that it is well protected from accidental injury when being used, and at the same time is visible to the operator.

A release valve 23 is placed in a convenient position on the handle 6 for the purpose of draining the pressure fluid from the chamber 6', and has for its principal use the deflating of overinflated tires.

Operation

When it is desired to inflate or deflate a pneumatic tire, one of the service chucks is pressed on to the exposed end of the tire tube to be filled, or deflated, thereby opening communication between the tire and air service apparatus in the usual manner. The face of the pressure gauge is so positioned as to be in the line of vision of the operator, so that when the connection is made, as stated above, he may observe the pressure as indicated on said gauge which is the pressure within said tire. Should the pressure as indicated be too low, then the operator presses on the button 17', thereby opening the valve 15 against the action of the spring 18, when the high pressure air from the service hose 13 will pass thru valve 14 into chamber 6', thence thru openings 21 to the annular passage-way 20 thru openings 24 into pipes 11 and 12, and thence thru the service chuck which is in communication with the tire tube, and into the tire. When a sufficient amount of air pressure is permitted to pass into the tire, which will be shown by the gauge, the button 17' is released, and the valve automatically closes.

Should the air pressure be too high in the tire, and it is desired to deflate the same to the proper pressure, the operator leaves valve 14 closed and opens the release valve 23 to permit the excess air to escape into the atmosphere until the proper pressure is reached, and then the release valve is closed and service chuck removed. In order that this device may be universal in its use in servicing tires with the tire stem in different positions and still maintain the pressure gauge in the operator's line of vision, the oppositely disposed service chucks are positioned as shown. It is apparent that in some cases it might be desirable to have more than two such service chucks.

We do not limit this invention to the structure shown and described, as many modifications may be made within the scope of the appended claim without departing from the spirit thereof.

What is claimed as new and desired to be secured by Letters Patent is:

The combination in an inflating device having a connecting chuck, a dial type pressure gauge, a control valve mechanism and connecting air passages, of a gauge supporting portion comprising a body having a thickness greater than the gauge and having a cylindrical opening therethrough sufficiently larger than the gauge so that said gauge may be revolved for attachment or detachment, one of the air passages extending through said body around the gauge and having a connection to the gauge.

In testimony whereof, we hereunto affix our signatures.

ARCHIE M. BAIRD.
FRED J. PARTRIDGE.